US006646048B2

(12) United States Patent
Matsuda et al.

(10) Patent No.: US 6,646,048 B2
(45) Date of Patent: Nov. 11, 2003

(54) SILANE-FUNCTIONIZED ACRYLIC PRIMER COMPOSITION

(75) Inventors: Hideyuki Matsuda, Kanagawa (JP); Akihiro Miyata, Kanagawa (JP); Kazunori Ishikawa, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 412 days.

(21) Appl. No.: 09/926,244

(22) PCT Filed: Jan. 26, 2001

(86) PCT No.: PCT/JP01/00519

§ 371 (c)(1),
(2), (4) Date: Sep. 28, 2001

(87) PCT Pub. No.: WO01/55267

PCT Pub. Date: Aug. 2, 2001

(65) Prior Publication Data

US 2002/0198311 A1 Dec. 26, 2002

(30) Foreign Application Priority Data

Jan. 28, 2000 (JP) ........................................ 2000-020705

(51) Int. Cl.$^7$ ............................. C08L 83/08; C08L 63/02
(52) U.S. Cl. ...................... 525/100; 525/107; 526/279; 526/319; 526/320; 526/326; 526/328; 526/329.7; 528/38; 528/35; 524/424
(58) Field of Search ................................. 525/100, 107; 526/279, 319, 320, 326, 328, 329.7; 528/38; 524/424

(56) References Cited

U.S. PATENT DOCUMENTS 5,185,418 A * 2/1993 Furukawa et al. ......... 526/329.2
5,399,601 A * 3/1995 Kusumi et al. ............. 524/188
5,753,737 A * 5/1998 Matsumura et al. ........ 524/315

FOREIGN PATENT DOCUMENTS

| JP | 58-171430 | 10/1983 |
| JP | 59-174658 | 10/1984 |
| JP | 03-068668 | 3/1991 |
| JP | 10-060216 | 3/1998 |
| JP | 10-060365 | 3/1998 |
| JP | 11-209682 | 8/1999 |
| WO | WO 94/29390 | 12/1994 |

OTHER PUBLICATIONS

International Search Report mailed on Apr. 17, 2001.

* cited by examiner

*Primary Examiner*—Robert Dawson
*Assistant Examiner*—Marc S. Zimmer
(74) *Attorney, Agent, or Firm*—Rader, Fishman & Grauer PLLC

(57) ABSTRACT

A primer composition comprising: (A) 100 parts by weight of a reactive acrylic resin comprising a main chain composed of a copolymer of two types of alkylmethacrylates having different number of carbon atoms and a side chain having a group with a hydroxyl group and at least one aromatic ring; (B) 100 to 500 parts by weight of a silane compound obtained by reaction of an aminosilane having two amino groups with dialkoxyepoxysilane and trialkoxyepoxysilane at a predetermined ratio; (C) 10 to 300 parts by weight of an epoxy resin of bisphenol A type having an epoxy equivalent of 1,000 to 2,000 g/eq.; and (D) 100 to 500 parts by weigh of carbon black is provided. The composition is excellent in storage stability and can retain excellent adhesion during the time from the coating of the primer until the coating of a sealant and further is excellent in weatherability.

4 Claims, No Drawings

SILANE-FUNCTIONIZED ACRYLIC PRIMER COMPOSITION

TECHNICAL FIELD

The present invention relates to a primer composition. More particularly, the present invention relates to a primer composition that is excellent in storage stability so that it can retain excellent adhesion from the time after the coating of a primer until the coating of a sealant and that is excellent also in weatherability and that it can be advantageously used on glass or silicon hard coat, particularly when using a sealant for fixing glass of automobiles.

BACKGROUND ART

Usually, for bonding window glasses of an automobile, excellent initial adhesion, high bonding strength and bonding durability are required under various conditions such as low temperatures, high temperatures and high humidities. Furthermore, after the bonding of window glasses, the periphery of the window glass of an automobile directly contacts the open air and exposed to sunlight, so that it is very important that the bonding is excellent in weatherability (including weatherability to light, that is, resistance to light).

Sealants useful for bonding nonporous substrates such as glass typically include urethane base sealants. However, where a glass substrate is bonded to a metal using such a urethane base sealant (when a window glass is incorporated in the manufacture of automobiles and so forth), the repeated shear strength of the bonded substrate may sometimes fail to reach the desired safety guideline or structural guideline. Accordingly, in most car body assembly works, coating of a primer prior to the coating of a sealant is generally adopted in the case where the front glass and rear window are bonded to the body.

As such a primer, there has heretofore been used those primers that comprise a binder component (film-forming component) such as polyester polyurethane or acrylic resin and a silane coupling agent, polyisocyanate, carbon black or the like blended therein.

When urethane resin such as polyester polyurethane is used as the binder component, the quality is at high levels but there has been a problem that the weatherability and cost are ill-balanced. In particular, when a certain time elapsed after coating the primer, the isocyanate groups in the urethane resin react with the moisture in the open air so that the activity of the primer surface is deteriorated. As a result, the urethane resin has to be coated again in order to obtain a sufficient adhesion, thus causing the problem of poor workability.

The isocyanate based glass primer as described above caused another problem that it gives only insufficient adhesion to the resin glass with a silicone hard coat, and so forth.

To improve these problems, JP 10-060365 A discloses an example in which instead of the urethane based film forming component, a combination usage, a silicate oligomer component and an acrylic based resin component obtained by copolymerization of an acrylate monomer with a hydroxyl group- or alkoxysilyl group-containing acrylate monomer in a predetermined ratio in the co-presence of a silicate oligomer.

Also, JP 10-060216 A discloses an example in which an acrylic copolymer having a hydroxyl group, an alkoxysilyl group-containing acrylic copolymer having an epoxy group and a hydroxyl group, a curing catalyst and a hydrolyzable silicone compound are blended.

However, although the acrylic based film forming component improves the storage stability and weatherability, it gives rise to poor adhesion as compared with the primer that uses the isocyanate component.

Accordingly, there has been demanded a primer composition that is excellent in both storage stability and weatherability, has high retention of adhesion after the coating of the primer so that its workability can be improved, and ensures sufficient adhesion to resin glass with a silicone hard coat.

Therefore, an object of the present invention is to provide a primer composition that is excellent in storage stability, can retain excellent adhesion without losing the effect during the time from the coating of the primer to the coating of the sealant, and further has excellent weatherability. In particular, an object of the present invention is to provide a primer composition that can be advantageously used for glass or silicone hard coat of glass fixing sealant in an automobile.

DISCLOSURE OF THE INVENTION

According to the present invention, there is provided a primer composition characterized by comprising:

(A) 100 parts by weight of a reactive acrylic resin comprising a main chain composed of a copolymer of a methacrylate with an alkyl group having 1 or 2 carbon atoms and a methacrylate with an alkyl group having 4 to 10 carbon atoms in a weight ratio of 9:1 to 3:7 and a side chain having a group with a hydroxyl group and at least one aromatic ring at a ratio of 0.1 to 30% based on the degree of polymerization of the main chain;

(B) 100 to 500 parts by weight of a silane compound obtained by reaction of 2 to 3 moles in total of dialkoxyepoxysilane and trialkoxyepoxysilane per mole of an aminosilane having two amino groups, with the molar ratio of the above-mentioned dialkoxyepoxysilane to the trialkoxyepoxysilane being 3:7 to 9:1;

(C) 10 to 300 parts by weight of an epoxy resin of bisphenol A type having an epoxy equivalent of 1,000 to 2,000 g/eq.; and (D) 100 to 500 parts by weight of carbon black.

Further, according to the present invention, there is provided a primer composition, characterized in that the reactive acrylic resin (A) further contains in the side chain thereof 10% or less, based on the degree of polymerization of the main chain, of a group having an alkoxysilyl group.

Still further, according to the present invention, there is provided a primer composition, characterized in that in said reactive acrylic resin (A), the main chain thereof comprises a copolymer composed of methyl methacrylate and butyl methacrylate.

BEST MODE FOR CARRYING OUT THE INVENTION

Hereinafter, the primer composition of the present invention will be described in detail. First, the components that constitute the primer composition of the present invention are illustrated.

(A) Reactive Acrylic Resin

The reactive acrylic resin used in the present invention is a reactive acrylic resin comprising a main chain composed of a copolymer of a methacrylate with an alkyl group having 1 or 2 carbon atoms and a methacrylate with an alkyl group having 4 to 10 carbon atoms in a weight ratio of 9:1 to 3:7 and a side chain having a group with a hydroxyl group and at least one aromatic ring.

In the main chain of the above-mentioned reactive acrylic resin, the methacrylate with an alkyl group having 1 or 2 carbon atoms includes methyl methacrylate and ethyl methacrylate and so forth, with methyl methacrylate being particularly preferred.

On the other hand, the methacrylate with an alkyl group having 4 to 10 carbon atoms includes n-butyl methacrylate (butyl methacrylate), isobutyl methacrylate, t-butyl methacrylate, 2-ethylhexyl methacrylate, cyclohexyl methacrylate, benzyl methacrylate and so forth, with n-butyl methacrylate and isobutyl methacrylate being preferred since these are inexpensive.

The methacrylate with an alkyl group having 1 or 2 carbon atoms and the methacrylate with an alkyl group having 4 to 10 carbon atoms may be selected from among the above exemplified compounds, and may be used singly or two or more of them may be used in combination.

In the present invention, the above-mentioned two types of methacrylates are used as the monomers that constitute the main chain of the reactive acrylic resin. Use of monomers with alkyl groups with large carbon atom numbers gives high adhesion of the acrylic resin to an adherend, which can contribute to the improvement of adhesion. However, use of the monomers with large carbon atom numbers alone is not desirable since it leads to a decrease in flowability of the acrylic resin and conversely results in a deteriorated adhesion of the acrylic resin to an adherend. Accordingly, in the present invention it is attempted to adjust the balance between them by using in combination a monomer with a smaller carbon atom number and a monomer with a larger carbon atom number in a predetermined ratio. That is, setting the weight ratio of the methacrylate with an alkyl group having 1 or 2 carbon atoms to the methacrylate with an alkyl group having 4 to 10 carbon atoms in the range of 9:1 to 3:7 gives rise to good adhesion to an adherend, in particular to glass or adherend with a silicone hard coat and quick film forming property. In particular, setting the above-mentioned weight ratio in the range of 7:3 to 4:6 is preferred since it further improves the balance between the properties.

To introduce the group having a hydroxyl group and at least one aromatic ring to the side chain, for example, a compound having a hydroxyl group and at least one aromatic ring and a polymerizing functional group such as a vinyl group or methacryloxy group may be graft polymerized.

The compound having a hydroxyl group and at least one aromatic ring and further a polymerizing functional group such as a vinyl group or methacryloxy group includes 2-hydroxy-3-phenyloxypropyl acrylate and so forth and its commercially available product includes, for example, Aronix M5700 (trade name) produced by Toa Gosei Chemical Industry Co., Ltd.

If the acrylic resin of the present invention contains the above-mentioned group having a hydroxyl group and at least one aromatic ring at a ratio of 0.1 to 30% based on the degree of polymerization of the above main chain, sufficient adhesion can be obtained. The content is preferably in the range of 1 to 20%. In this case, the improvement of adhesion is remarkable.

The above-mentioned range can be attained by reacting 0.1 to 30% by weight, preferably 1 to 20% by weight of the compound having a group with a hydroxyl group and at least one aromatic compound with a polymerizing functional group based on the total amount of the above-mentioned two types of methacrylates.

In the present invention, it is preferred that use is made of a reactive acrylic resin having further an alkoxysilyl group as the side chain for the above-mentioned reactive acrylic resin. Compounds further having an alkoxysilyl group in addition to the group having a hydroxyl group and at least one aromatic group as a side chain are preferred since they can develop adhesion in a shorter time.

To introduce an alkoxysilyl group to the side chain, an alkoxysilane compound having a polymerizing functional group such as a vinyl group or a methacryloxy group may be graft polymerized.

The alkoxysilane compound having a vinyl group includes vinyltrimethoxysilane, vinyltriethoxysilane, and tris(2-methoxyethoxy)vinylsilane.

The alkoxysilane compound having a methacryloxy group includes γ-(methacryloxypropyl)trimethoxysilane.

The above-mentioned group having an alkoxysilyl group may be contained in an amount of preferably 10% or less based on the degree of polymerization of the above main chain so that the above-mentioned effects can be obtained sufficiently. If it is contained in an amount of 0 to 5%, the effects are more remarkable.

To attain the above-mentioned range, for example, preferably 10% by weight or less, or more preferably 0 to 5% by weight of the compound having an alkoxysilyl group and polymerizing functional group based on the total amount of the above-mentioned two types of methacrylates that constitute the main chain may be reacted.

As one example, the method for producing the acrylic resin of the present invention includes a method which comprises: adding in a solvent such as methyl ethyl ketone or ethyl acetate a methacrylate with an alkyl group having 1 or 2 carbon atoms in the main chain, a methacrylate with an alkyl group having 4 to 10 carbon atoms in the main chain, the compound having the group a hydroxyl group and at least one aromatic ring and a polymerizing functional group, the compound having an alkoxysilyl group and polymerizing functional group if necessary, and further other vinyl monomer or radical polymerizing vinyl monomer in an amount not interfering with the object of the present invention; and reacting at a temperature in the range of 50 to 90° C., preferably 60 to 80° C. for 6 to 48 hours, preferably 12 to 36 hours to perform radical polymerization using a peroxide, an azo compound or the like as polymerization initiator. Further, to control the polymerization, the polymerization may be performed with adding the additive described in Macromolecules, Vol. 31, p542 and p545, 1998.

(B) Silane Compound

The primer composition of the present invention contains 100 parts by weight of the above-mentioned reactive acrylic resin (A) and 100 to 500 parts by weight of the silane compound (B).

In the present invention, the silane compound (B) is a compound obtained by reaction of 2 to 3 moles in total of dialkoxyepoxysilane and trialkoxyepoxysilane per mole of an aminosilane having two amino groups, with the molar ratio of the above-mentioned dialkoxyepoxysilane to the trialkoxyepoxysilane being 3:7 to 9:1.

In the present invention, the aminosilane having two amino groups is a compound having two amino groups and a hydrolyzable alkoxysilyl group.

The alkoxysilyl group is preferably bifunctional and/or trifunctional alkoxysilyl group, with a trimethoxysilyl group, a triethoxysilyl group, a dimethoxysilyl group or a diethoxysilyl group being particularly preferred.

Therefore, the aminosilane used in the present invention includes N-(β-aminoethyl)-γ-aminopropyltrimethoxysilane, N-(β-aminoethyl)-γ-aminopropylmethyldimethoxysilane, N-(β-aminoethyl)-γ-aminomethyltrimethoxysilane, N-(β-aminoethyl)-γ-aminopropyltriethoxysilane, and N-(β-aminoethyl)-γ-aminopropyltriethoxysilane. Among these, aminosilane having a methoxysilyl group, that is, N-(β-aminoethyl)-γ-aminopropyltrimethoxysilane, (β-aminoethyl)-7-aminopropylmethyldimethoxysilane, and N-(β-aminoethyl)-γ-aminomethyltrimethoxysilane are particularly preferred.

The dialkoxyepoxysilane in the present invention includes y-glycidoxypropylmethyldimethoxysilane, γ-glycidoxypropyldimethylethoxysilane, γ-glycidoxypropylmethyldiethoxysilane, and β-(3,4-epoxycyclohexyl)ethylmethyldimethoxysilane.

The trialkoxyepoxysilane in the present invention includes γ-glycidoxypropyltrimethoxysilane and β-(3,4-epoxycyclohexyl)ethyltrimethoxysilane.

The dialkoxyepoxysilane or trialkoxyepoxysilane may be selected from among the above-exemplified compounds and may be used singly or two or more of them may be used in combination.

In the silane compound (B) used in the present invention, the hydrolyzable alkoxysilyl group of the above-mentioned amino silane has contributes to the adhesion.

The silane compound (B) used in the present invention can be those compounds that can be obtained by reacting the above-mentioned aminosilane with two types of epoxysilanes differing in hydrolyzability from each other, that is, the dialkoxyepoxysilane and trialkoxyepoxysilane. Use of trialkoxyepoxysilane with high hydrolyzability further improves the adhesion. On the other hand, use of dialkoxyepoxysilane with relatively mild hydrolyzability enables retaining the storage stability. In the present invention, use of the two types of epoxysilane gives excellent balance between the storage stability and adhesion as compared with use of only either one of them in the same amount.

The molar ratio of the two types of epoxysilanes used is set such that the ratio of dialkoxyepoxysilane to trialkoxyepoxysilane is 3:7 to 9:1. If it exceeds this range, the above-mentioned balance is aggravated and the desired properties cannot be obtained. Preferably it is in the range of 5:5 to 9:1.

The two types of epoxysilane are reacted such that they occupy 2 to 3 moles in total per mole of the aminosilane having two amino groups, that is, epoxy group is contained in an amount equivalent to or slightly in excess of amino group.

In one example, the silane compound (B) used in the present invention can be obtained by mixing dialkoxyepoxysilane and trialkoxyepoxysilane with an aminosilane having two amino groups in a reactor in the presence of a solvent or in the absence of solvents, and reacting them at a temperature in the range of 40 to 60° C. for 20 to 50 hours. In the case where a solvent is used, solvents having suitable volatility such as methyl ethyl ketone and ethyl acetate are preferred. The amount of solvent is preferably 80% by weight or less of the reaction mixture.

The blending amount of the silane compound (B) in the present invention is 100 to 500 parts by weight, preferably 200 to 400 parts by weight per 100 parts by weight of the above-mentioned reactive acrylic resin (A). If the blending amount is in this range, sufficient adhesion can be obtained and the storage stability can be retained.

(C) Epoxy Resin

The primer composition of the present invention further contains a predetermined amount of epoxy resin (C) in addition to the above components (A) and (B).

The epoxy resin used in the present invention is of an epoxy resin of bisphenol A type having an epoxy equivalent (EPW) of 1,000 to 2,000 g/eq. This is because when the epoxy equivalent is outside the above range, the adhesion is insufficient.

More specifically, the epoxy resin includes YD-907 (EPW: 1,300 to 1,700), YD-017 (EPW: 1,750 to 2,100) and so forth, produced by Toto Kasei Co., Ltd.

The epoxy resin (C) is blended in an amount of 10 to 300 parts by weight per 100 parts by weight of the reactive acrylic resin (A). This is because in this range, the composition of the present invention has good curing property and weatherability.

(D) Carbon Black

The carbon black (D) used in the present invention is not particularly limited and may include N110, N220, N330, N550, N770 and the like according to American Society of Testing Materials (ASTM) and mixtures thereof.

Carbon black shields or absorbs ultraviolet rays and visible light so that blending carbon black can impart weatherability.

The blending amount of the above-mentioned carbon black (D) is 100 to 500 parts by weight per 100 parts by weight of the above-mentioned reactive acrylic resin (A). If it is within this range, the carbon black (D) has good compatibility with the reactive acrylic resin (A) and the dispersibility of carbon black in the composition can be secured. The blending amount of the above-mentioned carbon black (D) is preferably 100 to 300 parts by weight per 100 parts by weight of the above-mentioned reactive acrylic resin (A).

The primer composition of the present invention can be prepared so as to have a solids content of 20 to 50% by weight in the composition, preferably 25 to 35% by weight, by addition of an organic solvent.

In the present invention, a small amount of organic solvent is used when synthesizing the above-mentioned acrylic resin (A) or silane compound (B). In this case, the organic solvent contained in each component does not have to be removed. Each component may be blended in a state where it contains the organic solvent and an additional organic solvent may be added to the resulting composition such that the solids content is in the range described above.

The organic solvent used in the present invention is preferably the one that is inert to the both components (A) and (B) and further has suitable volatility and the one that has good compatibility with the organic solvent that has been already contained is selected.

Examples thereof may include methyl ethyl ketone, ethyl acetate, butyl acetate, cellosolve acetate, mineral spirit, toluene, xylene, dimethylacetamide, acetone, n-hexane, methylene chloride, tetrahydrofuran, ethyl ether, dioxane and so forth, with methyl ethyl ketone and ethyl acetate being preferred. These organic solvents may be singly or two or more of them may be used in combination. When using the organic solvents, it is preferred that they be sufficiently dried or dehydrated before they can be blended.

The primer composition of the present invention may use a stabilizer in combination in addition to the above components in order to further increase storage stability. The stabilizer is not particularly limited and any known stabilizer may be used. In particular, active methylene compounds such as diethyl malonate and monoalcohols such as methyl alcohol and ethyl alcohol are preferred.

To further increase storage stability, a water absorber may be used. The water absorber may include synthetic or natural zeolite and so forth. Any known water absorber may be used optionally as far as it does not interfere with the object of the present invention.

The water absorber includes preferably zeolite based water absorbers such as synthetic or natural zeolite from the viewpoint of water absorbing capability. Among them, those having a pore diameter of about 3 to about 10 Angstroms are preferably used. Preferred specific examples of commercially available zeolite include Bailit L powder produced by Bayer AG, Molecular Sieve produced by Union Carbide Corporation, Zeolam produced by Tosoh Corporation and so forth.

The water absorber may be either the one that dissolves or the one that does not dissolve in the primer of the present invention. In the case where it does not dissolve in the primer composition, it may be allowed to co-exist with the primer composition.

To further improve the weatherability and workability of the primer composition of the present invention, other components may be added in addition to the above-mentioned components. For example, blending inorganic pigments such as lamp black, titanium white, red oxide, titanium yellow, zinc white, red lead, cobalt blue, iron black, and aluminum powder; organic pigments such as Neozabon Black RE, Neo Black RE, Orazole Black CN, Orazole Black Ba (each produced by Ciba Geigy), Spiron Blue 2BH (produced by Hodogaya Chemical Co., Ltd.; ultraviolet absorbents such as Cyasorb (Cyasorb UV24Light Absorber, produced by American Cyanide and Uvinul (Uvinul D-49, D-50, N-35, N-539, produced by General Aniline) and so forth is effective for shielding or absorbing ultraviolet rays or visible light to improve the resistance to light of the primer composition. Further there may be added fillers such as glass powder, clay, powder silica gel, microfine powder silicic acid, and molecular sieves (which also has water absorbing capability), tackifiers, plasticizers that imparts flexibility to the primer film and improve the adhesive strength thereof such as butyl benzyl phthalate, dioctyl phthalate, dibutyl phthalate and chlorinated paraffin.

The method for producing the primer composition of the present invention is no particularly limited. For example, it can be prepared by suitably dissolving the reactive acrylic resin (A), silane compound (B), epoxy resin (C), and carbon black (D) in an organic solvent in a reactor, with optionally other additives and sufficiently kneading the mixture using a mixer such as ball mill to form a uniform dispersion.

The thus-obtained primer composition of the present invention can give desired adhesion without using any isocyanate component as the film forming component by blending the silane compound (B) having an alkoxysilyl group that differs in hydrolyzability. Thus, it is excellent also in storage stability.

Use of the reactive acrylic resin (A) and a predetermined epoxy equivalent of the epoxy resin (C) in combination improves the retention of adhesion and weathering stability of the composition after its coating. Therefore, the maintenance work during the time from the coating of the primer to the coating of the sealant is no longer necessary. Thus, the workability can be improved.

Further, the primer of the present invention is excellent in dispersibility of carbon that is essential in retaining weatherability, in particular weatherability to light so that it has carbon settling preventing effect.

The primer composition of the present invention having the above-described properties can be advantageously used for glass or an adherend with a silicone hard coat, particularly when using a sealant for fixing glass for an automobile.

EXAMPLES

Hereinafter, the present invention will be described in more detail by reference to examples. However, the present invention should not be limited to these examples.

1. Synthesis of Silane Compounds

Mixed solutions containing respective components in the formulations shown in Table 1 were each reacted in a reactor at 50° C. for 40 hours to obtain silane compounds of the present invention (S-1 to S-4).

Similarly, comparative compounds (S-5 and S-9) were synthesized using the formulations shown in Table 1. S-5 and S-6 show examples in which a single epoxysilane was used. S-7 shows an example in which an aminosilane that has only one amino group was used. S-8 shows an example in which the use amount of the two types of epoxysilanes was outside the range of the present invention. S-9 shows an example in which the ratio of trimethoxyepoxysilane:methyldimethoxyepoxysilane was 8:2, which was outside the range used in the present invention.

TABLE 1

| Molar Ratio | Example | | | | Comparative Example | | | | |
|---|---|---|---|---|---|---|---|---|---|
|  | S-1 | S-2 | S-3 | S-4 | S-5 | S-6 | S-7 | S-8 | S-9 |
| Trimethoxyepoxysilane (a) | 1.15 | 0.30 | 1.5 | 0.70 | 2.30 |  | 1.15 | 2.00 | 1.84 |
| Methyldimethoxyepoxysilane (b) | 1.15 | 2.00 | 1..5 | 1.60 |  | 2.30 | 1.15 | 2.00 | 0.46 |
| Two amino groups-containing aminosilane | 1.00 | 1.00 | 1.00 | 1.00 | 1.00 | 1.00 |  | 1.00 | 1.00 |
| Single amino group-containing aminosilane |  |  |  |  |  |  | 1.00 |  |  |
| Molar ratio of (b)/(a) | 1.00 | 6.67 | 1.00 | 2.29 | — | 0 | 1.00 | 1.00 | 0.25 |

In Table 1 above, as the components, the following were used.

Trimethoxyepoxysilane: A187, produced by Nippon Unicar Company Ltd.

Methyldimethoxyepoxysilane: AZ6137, produced by Nippon Unicar Company Ltd.

Two amino groups-containing aminosilane:
N-(β-aminoethyl)-γ-aminopropyltrimethoxysilane, A1120, produced by Nippon Unicar Company Ltd.
Single amino group-containing aminosilane:
γ-Aminopropyltriethoxysilane, A1100, Nippon Unicar Company Ltd.

2. Synthesis of Acrylic Resin

Respective components were mixed in formulations shown in Table 2 and an organic solvent (methyl ethyl ketone, hereinafter described as "MEK") was added so as to occupy about 1% by weight of each reaction mixture. To the mixtures was further added AIBN (azobisisobutyronitrile) as a polymerization initiator. The resulting mixed solutions were each reacted at 70° C. for 24 hours to obtain acrylic resins (A-1 to A-4) of the present invention.

Similarly, comparative compounds (A-5 to A-10) were synthesized in the formulations shown in Table 2. A-5 and A-8 show examples in which a group having a hydroxyl group and an aromatic ring is not present in the side chain, A-6 and A-7 show examples in which the ratio of the two types of methacrylates were outside the range of the present invention, and A-9 and A-10 show examples in which the ratio of the groups was outside the range of the present invention.

2) Adhesion Test

To glass or an adherend applied to glass surface by silicone hard coating was coated the prepared primer composition over a coating area of 25 to 150 mm. Then, a urethane sealant and an adhesive (trade name: WS-1000, produced by Yokohama Rubber Co., Ltd.) were pressed thereon to obtain a test piece.

TABLE 2

| Weight ratio | Example | | | | Comparative Example | | | | | |
|---|---|---|---|---|---|---|---|---|---|---|
| | A-1 | A-2 | A-3 | A-4 | A-5 | A-6 | A-7 | A-8 | A-9 | A-10 |
| Methyl methacrylate (MMA) | 5 | 9 | 3 | 5 | 5 | 10 | 2 | 5 | 5 | 5 |
| Butyl methacrylate (BMA) | 5 | 1 | 7 | 5 | 5 | | 8 | 5 | 5 | 5 |
| M5700 | 2 | 2 | 2 | 2 | | 2 | 2 | | 5 | 2 |
| Hydroxyethyl methacrylate | | | | | 2 | | | | | |
| Methacrylalkoxysilane | 1 | 1 | 1 | | 1 | 1 | 1 | | 1 | 2 |
| Weight ratio of (MMA)/(BMA) | 1.00 | 9.00 | 0.43 | 1.00 | 1.0 | — | 0.25 | 1.00 | 1.00 | 1.00 |

As the respective components in Table 2 above, the following compounds were used.

M5700: 2-Hydroxy-3-phenyloxypropyl acrylate

Methacrylate having a hydroxyl group and an aromatic ring, Aronix M5700, produced by Toa Gosei Chemical Industry Co., Ltd.

Methacrylalkoxysilane: A174, produced by Nippon Unicar Company Ltd.

3. Preparation and Evaluation of Primer Composition

Respective components were blended in the proportions described in Tables 3 to 5 and methyl ethyl ketone was added thereto to prepare primer compositions each having a solids content of 30% by weight, which were evaluated for carbon black settling property, adhesion to glass or silicone hard coat (in Tables, described as "Si H/C"), and storage stability.

1) Settling Property Test

The settling property of carbon black was observed and evaluated. The criteria for evaluation were as follows.

○: The coating film of supernatant after standing at 20° C. for 1 week was black.

X: The coating film of supernatant after standing at 20° C. for 1 week was not black.

The test piece was stored at 20° C. and at a humidity of 65% and subjected to peeling tests at the time of 1 day after the coating (adhesion (1)) and of 3 days after the coating (adhesion (2)), respectively and the states of the adhesion interface were observed. The criteria of evaluation were as follows.

○: The cohesion of the sealant layer was broken.

X: The sealant-primer interface was broken.

3) Storage Stability Test

The primer compositions stored at 60° C. for 2 weeks after the blending were evaluated. The criteria of evaluation were as follows.

○: The test of peeling adhesion to glass was ○.

X: Gelling occurred or the test of peeling adhesion to glass was X.

: No measurement was performed since the adhesion was already poor before the storage.

Primer composition 1

In the formulations shown in Table 3, the cases where the above-mentioned silane compounds (S-1 to S-9), respectively, were used were compared. The names used in the table were the same as those used in Tables 1 and 2 above.

TABLE 3

| Weight Ratio | Example | | | | | | Comparative Example | | | | | | |
|---|---|---|---|---|---|---|---|---|---|---|---|---|---|
| | 1 | 2 | 3 | 4 | 5 | 6 | 1 | 2 | 3 | 4 | 5 | 6 | 7 |
| A-1 | 1 | 1 | 1 | 1 | 1 | 1 | 1 | 1 | 1 | 1 | 1 | 1 | 1 |
| S-1 | 1 | 3 | 5 | | | | | | | | 12 | 0.5 | |
| S-2 | | | | 3 | | | | | | | | | |
| S-3 | | | | | 3 | | | | | | | | |
| S-4 | | | | | | 3 | | | | | | | |
| S-5 | | | | | | | 3 | | | | | | |
| S-6 | | | | | | | | 3 | | | | | |
| S-7 | | | | | | | | | 3 | | | | |
| S-8 | | | | | | | | | | 3 | | | |
| S-9 | | | | | | | | | | | | | 3 |
| Epoxy resin 1 | 1 | 1 | 1 | 1 | 1 | 1 | 1 | 1 | 1 | 1 | 1 | 1 | 1 |
| Diethyl malonate | 0.5 | 0.5 | 0.5 | 0.5 | 0.5 | 0.5 | 0.5 | 0.5 | 0.5 | 0.5 | 0.5 | 0.5 | 0.5 |
| Carbon black | 3 | 3 | 3 | 3 | 3 | 3 | 3 | 3 | 3 | 3 | 3 | 3 | 3 |
| Settling property | ○ | ○ | ○ | ○ | ○ | ○ | ○ | ○ | ○ | X | X | ○ | ○ |
| Adhesion (1) | | | | | | | | | | | | | |
| (Glass) | ○ | ○ | ○ | ○ | ○ | ○ | ○ | ○ | ○ | ○ | X | ○ | ○ |
| (Si H/C) | ○ | ○ | ○ | ○ | ○ | ○ | ○ | X | X | ○ | X | X | ○ |

TABLE 3-continued

|  | Example | | | | | | Comparative Example | | | | | | |
| --- | --- | --- | --- | --- | --- | --- | --- | --- | --- | --- | --- | --- | --- |
| Weight Ratio | 1 | 2 | 3 | 4 | 5 | 6 | 1 | 2 | 3 | 4 | 5 | 6 | 7 |
| Adhesion (2) | | | | | | | | | | | | | |
| (Glass) | o | o | o | o | o | o | o | o | o | o | x | o | o |
| (Si H/C) | o | o | o | o | o | o | o | x | x | o | x | x | o |
| Storage stability | o | o | o | o | o | o | x | o | o | o | — | o | x |

As the respective components in Table 3 above, the followings were used.

Epoxy resin 1: Bisphenol A type epoxy resin (EPW: 1425), YD-907, produced by Toto Kasei Co., Ltd.

Carbon black: ELFTEX8, produced by Cabot Corporation.

As will be apparent from Table 3, use of the silane compound obtained by reacting only the highly hydrolytic trimethoxyepoxysilane exhibits poor storage stability. On the other hand, use of the silane compound obtained by reacting only the mildly hydrolytic methyldimethoxysilane exhibits insufficient adhesion. Also, it reveals that the total blending amount of the two types of alkoxysilane which is outside the range of the present invention gives no desirable properties. Further, the blending amount of the silane compound of the present invention exceeding the predetermined range fails to give desired properties.

Primer composition 2

Comparisons were made among the cases using the above-mentioned acrylic resins (A-1 to A-10) in the formulations shown in Table 4. The names used in the table were the same as those used in Tables 1 to 3 above.

TABLE 4

|  | Example | | | | Comparative Example | | | | | |
| --- | --- | --- | --- | --- | --- | --- | --- | --- | --- | --- |
| Weight Ratio | 7 | 8 | 9 | 10 | 8 | 9 | 10 | 11 | 12 | 13 |
| A-1 | 1 | | | | | | | | | |
| A-2 | | 1 | | | | | | | | |
| A-3 | | | 1 | | | | | | | |
| A-4 | | | | 1 | | | | | | |
| A-5 | | | | | 1 | | | | | |
| A-6 | | | | | | 1 | | | | |
| A-7 | | | | | | | 1 | | | |
| A-8 | | | | | | | | 1 | | |
| A-9 | | | | | | | | | 1 | |
| A-10 | | | | | | | | | | 1 |
| S-1 | 3 | 3 | 3 | 3 | 3 | 3 | 3 | 3 | 3 | 3 |
| Epoxy resin 1 | 1 | 1 | 1 | 1 | 1 | 1 | 1 | 1 | 1 | 1 |
| Diethyl malonate | 0.5 | 0.5 | 0.5 | 0.5 | 0.5 | 0.5 | 0.5 | 0.5 | 0.5 | 0.5 |
| Carbon black | 3 | 3 | 3 | 3 | 3 | 3 | 3 | 3 | 3 | 3 |
| Settling property | o | o | o | o | x | o | o | x | x | o |
| Adhesion (1) | | | | | | | | | | |
| (Glass) | o | o | o | x | o | x | x | x | x | o |
| (Si H/C) | o | o | o | x | o | x | x | x | o | o |
| Adhesion (2) | | | | | | | | | | |
| (Glass) | o | o | o | o | o | x | x | x | x | o |
| (Si H/C) | o | o | o | o | o | x | x | x | o | o |
| Storage stability | o | o | o | o | o | — | — | — | — | x |

As will be apparent from Table 4, use of the acrylic resin having no group with an aromatic ring in the side chain exhibits poor carbon black settling property. On the other hand, use of methyl methacrylate or butyl methacrylate outside the range of ratio of the present invention shows poor adhesion.

If the amount of the group having a hydroxyl group and an aromatic ring is too large, the adhesion to a silicone hard coat will be good but other properties cannot be obtained. Further, if the amount of alkoxysilane is too large, although good adhesion may be obtained, the storage stability will be aggravated.

On the other hand, in the case where the acrylic resin does not have the group having an alkoxysilyl group in the side chain, it takes 3 days before the composition develops adhesion. However, this time span is within the range that should cause no problem for practical usage. Also, the settling property and storage stability of the composition are good. In the case where the acrylic resin has a group having an alkoxysilyl group in the side chain, the adhesion is developed after 1 day from the coating and other properties are excellent in good balance among them.

Primer composition 3

Comparison was made between the cases where epoxy resins 1 to 3 having different epoxy equivalents from each other were used in the formulations shown in Table 5 (Comparative Examples 15 and 16). Also, comparison was made between the cases where the blending amount of carbon black was varied (Comparative Examples 17 and 18). Further, comparison was made between the cases where the blending amount of epoxy resin 1 was varied (Comparative Examples 19 and 20). The names used in the table were the same as those used in Tables 1 to 4 above.

TABLE 5

|  | Example | | | Comparative Example | | | | | |
| --- | --- | --- | --- | --- | --- | --- | --- | --- | --- |
| Weight Ratio | 11 | 12 | 13 | 14 | 15 | 16 | 17 | 18 | 19 |
| A-1 | 1 | 1 | 1 | 1 | 1 | 1 | 1 | 1 | 1 |
| S-1 | 3 | 3 | 3 | 3 | 3 | 3 | 3 | 3 | 3 |
| Epoxy resin 1 | 1 | 0.1 | 3 | | | 1 | 1 | 0.05 | 5 |
| Epoxy resin 2 | | | | 1 | | | | | |
| Epoxy resin 3 | | | | | 1 | | | | |
| Diethyl malonate | 0.5 | 0.5 | 0.5 | 0.5 | 0.5 | 0.5 | 0.5 | 0.5 | 0.5 |
| Carbon black | 3 | 3 | 3 | 3 | 3 | 0.5 | 10 | 3 | 3 |
| Settling property | o | o | o | o | o | o | x | o | o |
| Adhesion (1) | | | | | | | | | |
| (Glass) | o | o | o | x | x | x | x | x | x |
| (Si H/C) | o | o | o | x | x | x | x | x | x |
| Adhesion (2) | | | | | | | | | |
| (Glass) | o | o | o | x | x | x | x | x | x |
| (Si H/C) | o | o | o | x | x | x | x | x | x |
| Storage stability | o | o | o | — | — | — | — | — | — |

As the respective components in Table 5 above, the followings were used.

Epoxy resin 2: Bisphenol A type epoxy resin (EPW: 956.3), YD-014, produced by Toto Kasei Co., Ltd.

Epoxy resin 3: Bisphenol A type epoxy resin (EPW: 2141), YD-909S, produced by Toto Kasei Co., Ltd.

As will be apparent from Table 5, desired properties can be obtained if the epoxy equivalent and blending amount of epoxy resin used and blending amount of carbon black used are within the ranges of the present invention.

INDUSTRIAL APPLICABILITY

The composition of the present invention is excellent in terms of the balance between the adhesion and storage stability by use of a silane compound obtained by reaction of two types of epoxysilanes differing in hydrolyzability from each other. Use of the reactive acrylic resin and epoxy resin in combination according to the present invention can ensure the balance between the adhesion and weatherability. Further, high dispersibility of carbon black in the composition results in very high weatherability.

The composition of the present invention has high retention of adhesion after coating it on an adherend. In particular, it has high adhesion to glass or an adherend with a silicone hard coat. As a result, it is suitable as a primer composition used for glass or silicone hard coat when using a sealant for fixing glass of an automobile.

What is claimed is:

1. A primer composition characterized by comprising:
   (A) 100 parts by weight of a reactive acrylic resin comprising a main chain composed of a copolymer of a methacrylate with an alkyl group having 1 or 2 carbon atoms and a methacrylate with an alkyl group having 4 to 10 carbon atoms in a weight ratio of 9:1 to 3:7 and a side chain having a group with a hydroxyl group and at least one aromatic ring at a ratio of 0.1 to 30% based on the degree of polymerization of the main chain;
   (B) 100 to 500 parts by weight of a silane compound obtained by reaction of 2 to 3 moles in total of dialkoxyepoxysilane and trialkoxyepoxysilane per mole of an aminosilane having two amino groups, with the molar ratio of the above-mentioned dialkoxyepoxysilane to the trialkoxyepoxysilane being 3:7 to 9:1;
   (C) 10 to 300 parts by weight of an epoxy resin of bisphenol A type having an epoxy equivalent of 1,000 to 2,000 g/eq.; and
   (D) 100 to 500 parts by weight of carbon black.

2. A primer composition according to claim 1, characterized in that said reactive acrylic resin (A) further contains in the side chain thereof 10% or less, based on the degree of polymerization of the main chain, of a group having an alkoxysilyl group.

3. A primer composition according to claim 1, characterized in that in said reactive acrylic resin (A), the main chain thereof comprises a copolymer composed of methyl methacrylate and butyl methacrylate.

4. A primer composition according to claim 1, characterized in that in said reactive acrylic resin (A), the main chain thereof comprises a copolymer composed of methyl methacrylate and butyl methacrylate and the side chain thereof contains a group having an alkoxysilyl group in 10% or less, based on the degree of polymerization of the main chain.

* * * * *